United States Patent [19]

Cheng

[11] Patent Number: 4,829,671
[45] Date of Patent: May 16, 1989

[54] COPPER CABLE WIRE PEELER

[76] Inventor: Yin-Ho Cheng, 1, Sublane 78, Lane 113, Chung Shan Road, Sec. 2, Shulin, Taipei Hsien, Taiwan

[21] Appl. No.: 120,698

[22] Filed: Nov. 9, 1987

[51] Int. Cl.$^4$ .............................................. H02G 1/12
[52] U.S. Cl. ....................................................... 30/90.1
[58] Field of Search ................... 81/9.4, 9.44; 30/90.1, 30/91.2

[56] References Cited

U.S. PATENT DOCUMENTS

| | | | |
|---|---|---|---|
| 2,875,516 | 3/1959 | Parks | 30/90.1 |
| 3,169,315 | 2/1965 | Mankovitz | 30/91.2 |
| 3,914,864 | 10/1975 | Prince | 30/91.2 |

FOREIGN PATENT DOCUMENTS 2724714 12/1977 Fed. Rep. of Germany ......... 81/9.4

Primary Examiner—Roscoe V. Parker
Attorney, Agent, or Firm—Lowe, Price, LeBlanc, Becker & Shur

[57] ABSTRACT

A copper cable wire peeler is disclosed. The peeler consists of biased jaws which, at one end, mount two blade cutters in the lower jaw disposed at different heights which blade cutter heights are adjustable by set screws. The upper jaw mounts a clamping member so that when the wire to be peeled is inserted, inner and out sheaths can be peeled from a copper wire. The blade cutters are also biased to permit fluctuations in the thickness of the wire due to low manufacturing tolerances.

4 Claims, 4 Drawing Sheets

4,829,671

COPPER CABLE WIRE PEELER

FIELD OF THE INVENTION

This invention relates to a simple and efficient cable wire peeler and especially to a peeler that includes a biased clamp to control the opening and closing of two chucking jaws and blade cutters set at different heights therein designed to peel the inner and outer plastic insulating sheaths from a copper wire.

BACKGROUND OF THE INVENTION

Normally, conducting copper cable comprises a solid copper wire in the center and a copper wire cord between inner and outer insulator sheaths. To expose the two copper wires then it is necessary to peel off the plastic insulators. Therefore, only a peeler that has two blade cutters at different heights can peel off the two insulators in one motion. In addition, cable wires are manufactured to different specifications and it is necessary to provide a cable wire peeler which is adjustable between wires of all sizes.

Conventional peelers often can peel the insulator sheaths off of cable wires of only one type wherein the blade cutter and chucks are not adjustable. In addition, commercially available peelers often are not adjustable based upon manufacturers variations in diameters of a specific wire. In other words, conventional peelers with fixed chucks and blade cutter depths often are sufficiently inflexible that normal manufacturing tolerances can not be taken into account.

Therefore, the conventional peelers have limited acceptance because the feed and cutter depths are normally not sufficiently adjustable. The procedure for using such peelers is often time complicated and difficult and it is easy to damage the cable wire itself.

SUMMARY OF THE INVENTION

The present invention provides a simple and efficient cable wire peeler wherein biased opposed jaw chucks are used to grip the cable and are easily released to release the cable. The angle of the blade cutters disposed in the jaws is adjustable and the blade cutters are biased to permit some movement to take into account variations in diameter of the copper wire. In addition, the upper jaw of said biased chucks has a replaceable element to take into account different sizes cable wires to be peeled.

DETAILED DESCRIPTION OF THE PREFERRED EMBODIMENT

Figure 3:
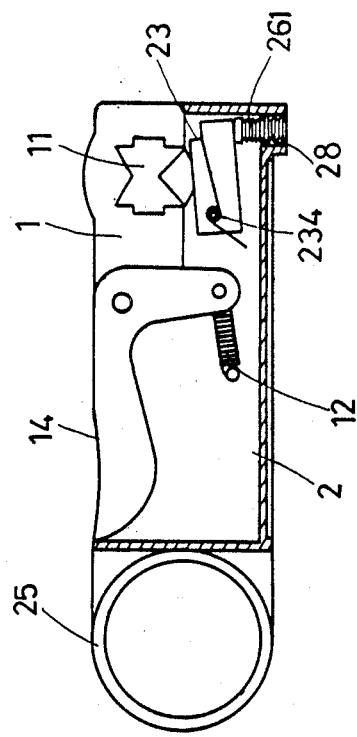
FIG. 3 is a cross-sectional view of the device of this invention.
Figure 4:
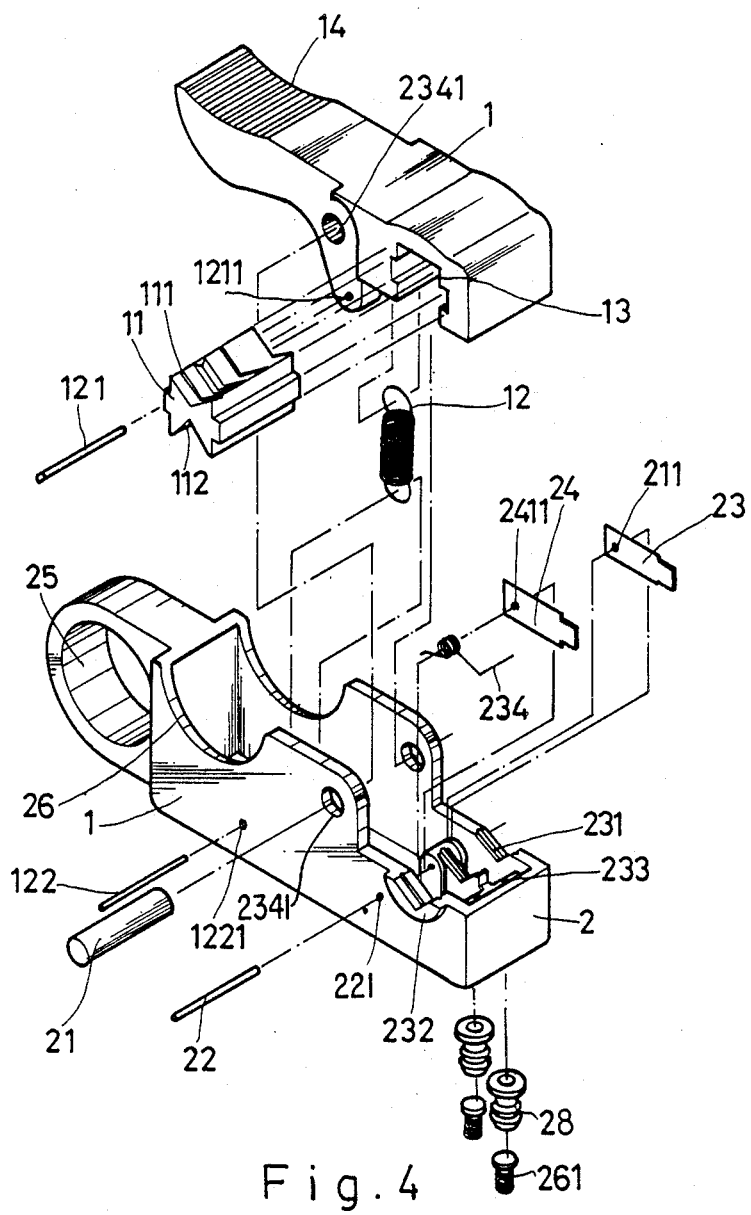
FIG. 4 is an exploded view of the device of this invention.

With attention to FIG. 4, the device of this invention consists of an upper jaw 1 and a pivotally interconnected lower jaw 2. Upper jaw 1 mounts a removable clamp member 11 and blade cutters are removable mounted in the lower jaw. The jaws are interconnected by pin 21 which extends through an axial hole 2341 in the lower jaw and a matching hole 2341 in the upper jaw. The rear portion of the upper jaw is a concave surface with convex threads and the front end of the jaw defines a frame 13 downwardly opening for insertion of the movable clamp 11. As shown in the drawing, clamp 11 comes with a plurality of tracks corresponding to tracks in the open area 13. The jaw is biased by spring 12 which is mounted at one end on pin 121 which extends through hole 1211 and on the opposite end with pin 122 which extends through hole 1221 in the lower jaw. The disposition of the lock spring can be seen in FIG. 3. Therefore when the concave portion 14 is pressed down the jaw will open and when released will automatically close. As shown in the figures, the concave portion 14 fits within the semicircular channel 26 in lower jaw 1.

The lower jaw 2 mounts a blade cutter holder at the front end. The holder comprises two blade cutting troughs 233 and blade cutters 23 and 24 which have respective mounting holes 2311 and 2411 at different heights. A locating pin 22 is inserted into hole 221 and through holes 2311 and 2411. A small coil spring 234 is also mounted on pin 22 as shown in FIG. 3. One end of each blade cutter is placed in the blade cutter trough 233 and because the holes therein are at different heights, the blade cutters will present different angles to facilitate peeling off inner and outer insulators. Spring 234 allows some movement of the blade cutters in accordance with the size of the cable wire to be peeled and groove 231 serves to locate the cable wire to be peeled as it is clamped. Two locating set screws 28 and 261 received within the lower jaw, and, with reference to FIG. 2, serve to adjust the height of the blade cutters. An Allen wrench 27 is attached to the lower jaw 2 on the underside for dismounting components and for adjusting the blade cutter height.

Figure 1:
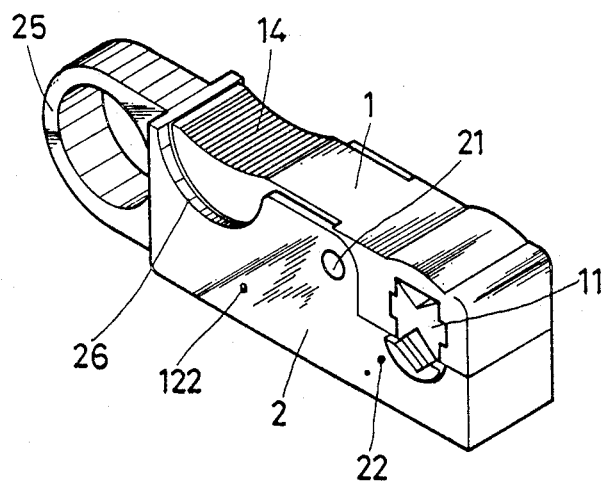
FIG. 1 is a front perspective view of a peeler of the present invention.
Figure 2:
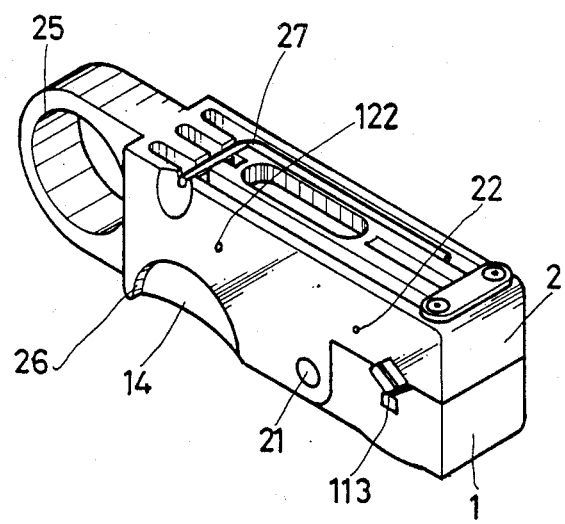
FIG. 2 is a bottom view in perspective of the device of this invention.

With further reference to FIG. 2, a small square stop 113 is disposed adjacent clamping device 11 to prohibit lateral movement thereof when the jaws are closed.

Finally, a ring shaped member 25 is disposed at the end of lower jaw 2 for insertion of the finger of the user to facilitate cutting the insulators precisely by rotating the device of this invention around the wire to be peeled.

The invention may be embodied in other specified forms without departing from the spirit or essential characteristics thereto. The present embodiments are therefore to be considered in all respects as illustrative and not restrictive, the scope of the invention being indicated by the appended claims rather than by the foregoing description, and all changes which may come within the meaning and range of equivalency of the claims are therefore intended to be embraced therein.

I claim:

1. A wire peeler for removing insulating sheaths from copper wire:

upper and lower arms pivotally interconnected at the central portion thereof, adjacent first ends defining upper and lower jaws, the opposite end of said lower jaw defining a U-shaped recess and the adjacent end of said upper jaw being received in said recess but normally spaced away from the bottom thereof so that when said end is depressed into said recess the jaws will open about the pivotal connection;

first bias means carried by said arms for normally urging said jaws into a closed position;

upper clamp means slidably received in the upper jaw for engaging the surface of a wire to be peeled when the wire extends through the jaw;

first and second cutter blades releasably and pivotally mounted in the lower jaw in alignment with said clamp means;

adjustment means coupled to said blades for adjusting the height thereof; and second bias means coupled to said blades for urging said blades upwardly against the wire to be peeled.

2. The peeler of claim 1 wherein the end of said lower arm opposite said jaw defines a ring.

3. The peeler of claim 2 wherein the recess in the lower arm is defined by sides with hemispherical cut out portions.

4. The peeler of claim 3 wherein the end of said upper arm received in the recesses concave with lateral grooves therein.

* * * * *